No. 875,020. PATENTED DEC. 31, 1907.
H. E. WALLIS.
AUTOMATIC STOKER.
APPLICATION FILED MAR. 18, 1907.
2 SHEETS—SHEET 2.
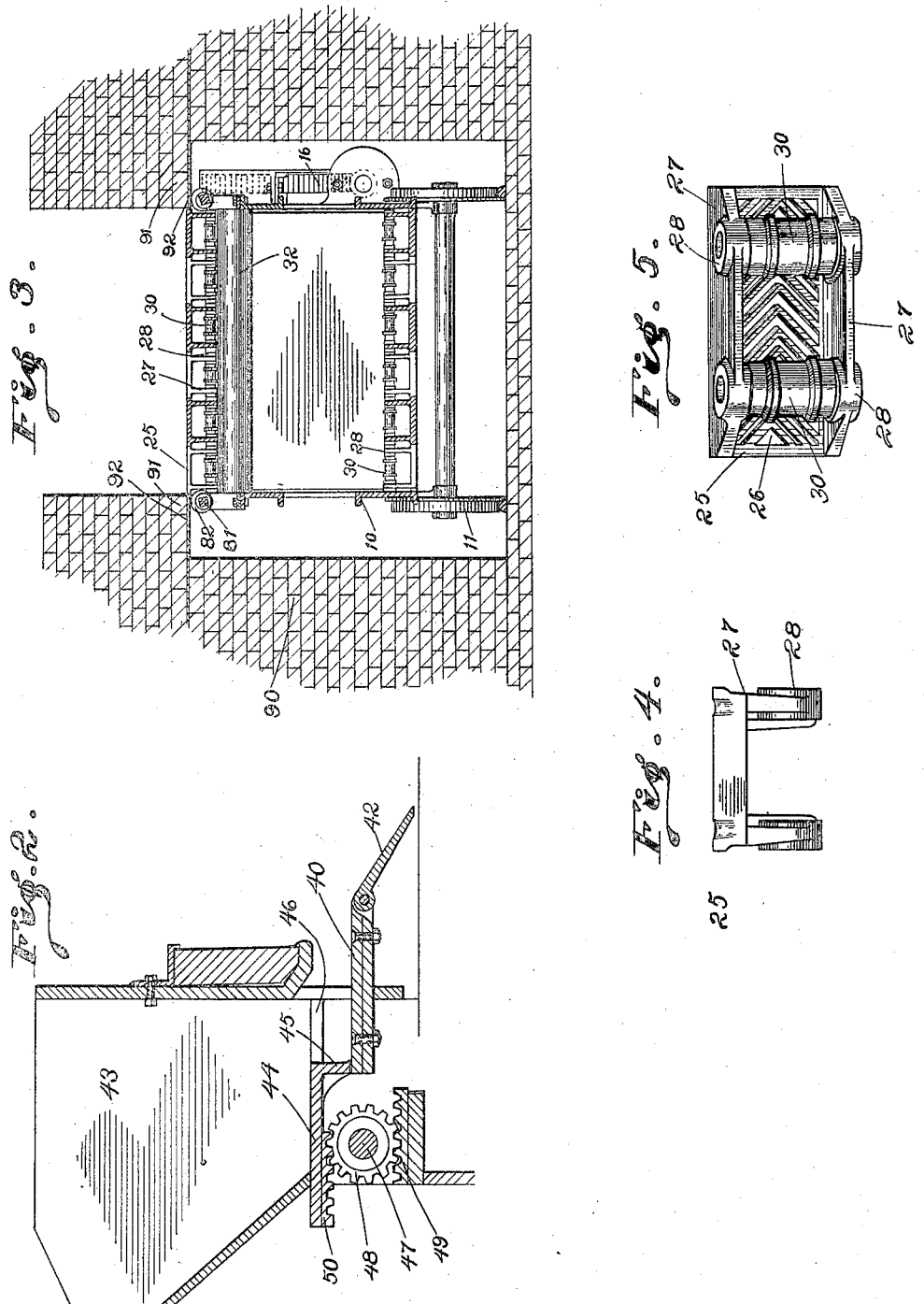
Witnesses
K. R. Clendening,
Thomas W. McMeans
Inventor,
Henry E. Wallis,
By Bradford Hood.
Attorneys.

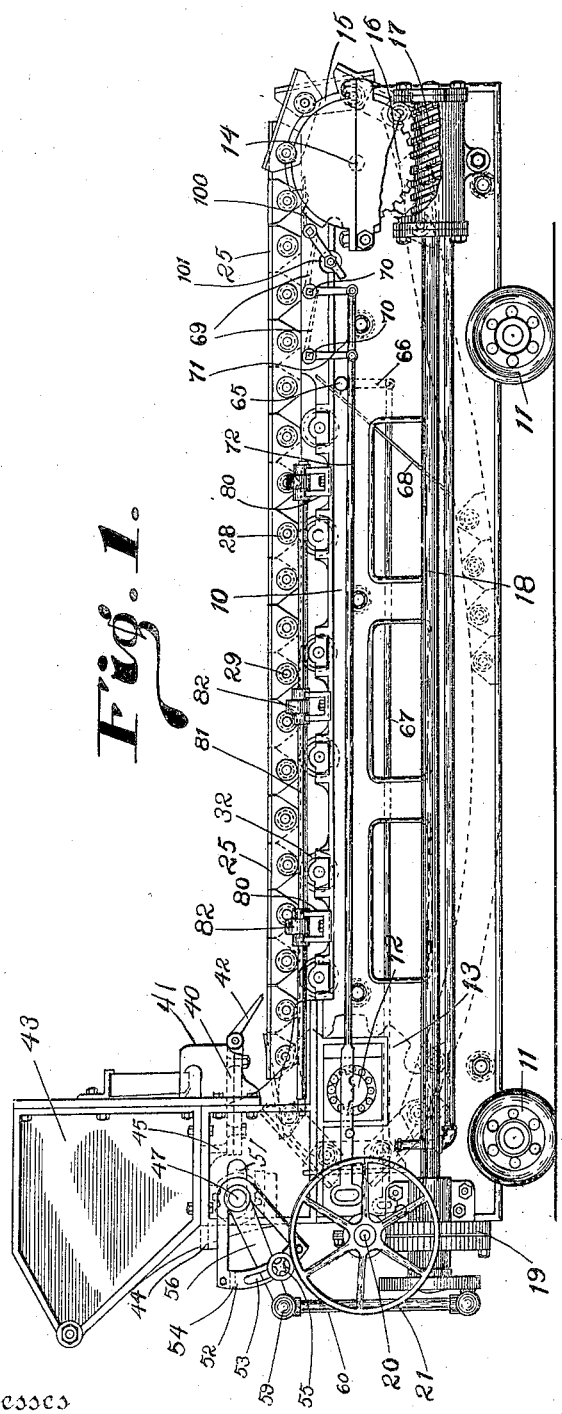

UNITED STATES PATENT OFFICE.

HENRY E. WALLIS, OF TERRE HAUTE, INDIANA, ASSIGNOR TO WALLIS STOKER AND MANUFACTURING CO., OF TERRE HAUTE, INDIANA, A CORPORATION OF INDIANA.

AUTOMATIC STOKER.

No. 875,020.  Specification of Letters Patent.  Patented Dec. 31, 1907.

Application filed March 18, 1907. Serial No. 362,977.

*To all whom it may concern:*

Be it known that I, HENRY E. WALLIS, a citizen of the United States, residing at Terre Haute, in the county of Vigo and State of Indiana, have invented certain new and useful Improvements in Automatic Stokers, of which the following is a specification.

My invention relates to an improvement in automatic stokers of the chain grate type, and the objects of said invention are; to produce a device of this kind which will prevent leakage of fresh fuel through the chain; to provide means for driving the chain under such conditions that it cannot buckle and so that differences in its length due to differences in temperature will not affect its proper operation; to provide improved means for actuating the fuel feeding mechanism; to provide an improved arrangement of dampers; and to provide such improvement in details of construction as may be hereinafter pointed out.

The accompanying drawings illustrate my invention: Figure 1 is a side elevation of an apparatus embodying my invention, a portion of the gear casing having been removed; Fig. 2 an enlarged vertical sectional detail of the hopper end; Fig. 3 a cross sectional detail showing my improved setting; and Figs. 4 and 5 perspective details of one of the chain-forming blocks.

In the drawings 10 indicates a main frame structure supported upon suitable traction wheels 11 by means of which the structure may be readily rolled into or withdrawn from the setting. Mounted at the forward end of frame 10 is a shaft 12 provided with suitable sprocket wheels 13. Mounted at the opposite or inner end of frame 10 is the drive shaft 14 provided with suitable driving sprocket wheels 15. Shaft 14 is provided with a worm wheel 16 driven by means of a worm 17 carried by the inner end of the shaft 18 which, at its forward end, is provided with a worm wheel 19 driven by a worm carried by a shaft 20 journaled in suitable bearings supported at the forward end of frame 10 and provided with a belt pulley 21. The grate is composed of a chain formed of a plurality of grate blocks 25 each of which consists of a main upper plate, having perforations 26 formed therethrough, and a pair of side flanges 27—27 at the edges of the plate 25. The flanges 27 are provided with suitable bearing lugs 28 which are perforated to receive cross pins 29, rollers 30 being placed between the flanges 27 of those blocks which are arranged in alinement with the sprocket wheels 13 and 15. The blocks are arranged alternately in adjacent longitudinal series thus forming an endless chain in the usual well known manner. By this construction a very light yet sufficiently strong and efficient grate is produced and, the live side of the chain being pulled forward from the inner end by the shaft 14, the upper or live side of the belt is always tight and under tension so that there can be no buckling under the load of fuel and any changes in length of the belt, due to changes in temperature, merely cause a variation in the slack side of the belt without in any manner affecting the live or working side. In addition to this, any back lash between the driving sprocket and the chain will not injuriously affect the operation. The live side of the chain is supported by a plurality of rollers 32 journaled in the main frame 10 and engaged by the lower straight edges of the flanges 27 of the blocks of which the chain grate is composed, thus holding the live side of the chain flat.

In the operation of chain grates heretofore it has been customary to deliver the fresh fuel directly upon the chain and, as this fuel is preferably delivered in as fine a condition as possible, considerable quantities of the fresh fuel sift immediately through the openings in the grate structure, and it therefore becomes necessary for the fireman to continually shovel the leakage back into the feeding hopper. In addition to the extra labor involved, this leakage prevents the installation of front delivery ash mechanism, because the ashes cannot be delivered through or over the unburned fuel sifting down through the grate. In order to prevent this action I therefore provide, immediately above the front end of the grate structure, a coking plate 40, preferably provided at its ends with retaining flanges 41. The coking plate 40 lies somewhat above the upper face of the grate structure and extends some distance inward beneath the usual arch, and consequently, in order to form a connection between the inner end of the coking plate and the grate structure, I provide a tail plate 42 which, at its upper forward edge, is hinged to the inner edge of plate 40, so that its inner edge may rest upon the chain grate structure thus permitting the coked fuel to be gradually drawn down along the tail plate and delivered to the chain grate in a substantially continuous and unbroken stream which will not be struck by a stream of cold air before it reaches the grate. Consequently the fuel reaches the chain grate in the best possible condition and is not broken up into fine bits which drop easily through the grate. Plate 40 is arranged at the delivery opening of the hopper 43 in such position as to receive fuel delivered thereto from the hopper by any suitable means. The delivery means should be such, however, that several strokes are necessary before a mass of fuel delivered by a given stroke of the mechanism can traverse the coking plate, thus giving sufficient time, while the fresh fuel is on the coking plate, for it to become welded into such condition that, when delivered to the grate structure, it is no longer in condition to sift down through the same. I have found a convenient feeding mechanism to consist of a plate plunger 44 provided at its inner ends with a downturned portion 45 which rests upon a bottom plate of the hopper 46. In order to reciprocate the plate plunger 44 I provide a shaft 47 having at each end a pinion 48 which meshes with and rests upon a stationary rack 49 and also meshes with a rack 50 formed on the under face of the plate plunger 44. Shaft 47 passes through a slot 51 formed in the adjacent portion of the main frame 10, the arrangement being such that, by rolling the pinions 48 upon the racks 49, the plunger plate 44 may be reciprocated. Secured to one end of shaft 47 is a segment 52 provided with a segmental slot 53. Segment 52 is provided at one end (see dotted lines in Fig. 1) with a finger 54, and mounted within segment 53 is an adjustable stop 55. Mounted so as to traverse the distance between finger 54 and the adjustable stop 55, is an operating arm 56 which is pivoted upon shaft 47. Connected to arm 56 by a ball or other suitable joint 59 is a crank pin 60 carried by shaft 18, the arrangement being such that rotation of shaft 18 serves to reciprocate arm 56 on shaft 47 and, as said arm comes into engagement with either the finger 54 or the stop 55 of segment 52, to turn shaft 47 upon its own axis and thus cause the gears 48 thereof to roll upon the stationary racks 49 and thus reciprocate the plate plunger 44.

In the operation of chain grates it is desirable to so control the drafts that the fuel will become entirely consumed and partially cooled before it reaches the discharge end of the grate, and in order to do this I journal in the frame 10, near the inner end thereof, a damper shaft 65 provided at one end with an operating lever 66 which may be operated by means of a rod 67 extended to a point convenient of access at the forward end of the frame. Secured to shaft 65, within frame 10, is a damper 68 which extends downward and forward so that it may normally rest upon the slack side of the chain, thus directing the air drafts upward and inward to a point somewhat forward of the inner end of the grate. In order to further control the air currents at the inner end of the grate I provide two or more dampers 69, 69 each of which is carried by a shaft 70 journaled in the frame 10 and provided at its outer end with an operating lever 71. Secured to each lever 71 is a rod 72 which is extended forward to a point convenient of access at the forward end of the structure. I also provide a damper 100, back of damper 69, which is yieldingly held against the lower face of the upper line of chain by a suitable counter weight 101.

In order to protect the shaft 14 from the heat of falling cinders, I surround said shaft between the sprockets 15 with sections of pipe of an internal diameter considerably greater than the diameter of the shaft.

In view of the fact that the mechanism necessary for operation of the various parts projects beyond the sides of the chain so that the ash pit of the setting must be considerably wider than is desirable for the setting above the plane of the live side of the chain, I journal at each side of the frame 10, in suitable brackets 80, a shaft 81 which, at its forward end, lies at a point convenient of access outside the setting. Shaft 81 is preferably polygonal in cross section in order to receive and turn with it a plurality of cams or eccentrics 82 which, by turning the shaft, are adapted to be projected upward into engagement with the overhanging portion of the setting. For instance, in Fig. 3, the setting 90 is shown as provided at each side with an overhanging portion 91, 91 beginning at the horizontal plane of the active side of the belt, said overhang being conveniently supported by plates 92. After the structure is projected in the setting, shafts 81 should be readily turned so that the cams 82 may be projected upward beneath and into engagement with the plates 92, thus supporting the overhanging portions of the setting.

I claim as my invention:

1. In a stoker of the chain grate type, the combination, with a suitable supporting frame, a pair of chain-supporting shafts journaled one at each end of said frame, and an endless chain grate carried by said shafts, a substantially horizontal support for said chain grate between said shafts, of means for driving the shaft at the inner end of the structure whereby the tight side of the belt will be the live side, a coking plate arranged above the chain grate, a pivoted tail-plate forming a connection between the inner end of said coking plate and the chain grate, and means for successively delivering small quantities of fuel to the coking plate.

2. In a stoker of the chain grate type, the combination, with a suitable supporting frame, a pair of chain-supporting shafts journaled one at each end of said frame, and an endless chain grate carried by said shafts, of means for driving the shaft at the inner end of the structure whereby the tight side of the belt will be the live side, a coking plate arranged above the chain grate, a feeding hopper adapted to deliver to said coking plate, a plunger arranged in said hopper and adapted to deliver to said coking plate, a rolling gear having a rolling meshing engagement with said plunger and a rolling meshing engagement with a stationary member, and means for rolling said gear.

3. In a stoker of the chain grate type, the combination, with a suitable supporting frame, a pair of chain-supporting shafts journaled one at each end of said frame, and an endless chain grate carried by said shafts, of means for driving the shaft at the inner end of the structure whereby the tight side of the belt will be the live side, a coking plate arranged above the chain grate, a pivoted tail plate forming a connection between the inner end of said coking plate and the chain grate, a feeding hopper adapted to deliver to said coking plate, a plunger arranged in said hopper and adapted to deliver to said coking plate, a rolling gear having a rolling meshing engagement with said plunger and a rolling engagement with a stationary member, and means for rolling said gear.

4. In a stoker of the chain grate type, the combination, with a suitable supporting frame, a pair of chain-supporting shafts journaled one at each end of said frame, and an endless chain grate carried by said shafts, of means for driving the shaft at the inner end of the structure whereby the tight side of the belt will be the live side, a coking plate arranged above the chain grate, a feeding hopper adapted to deliver to said coking plate, a plunger arranged in said hopper and adapted to deliver to said coking plate, a rolling gear having a rolling meshing engagement with said plunger and a rolling meshing engagement with a stationary member, a segment arm carried by said rolling gear, an actuating arm pivoted on the axis of said gear, a pair of stops carried by said segment arm and to which said operating arm may travel, and means for adjusting one of said stops toward the other.

5. In a stoker of the chain grate type, the combination, with a suitable supporting frame and a pair of chain-supporting shafts journaled one at each end of said frame, an endless chain grate carried by said shafts, of means for driving the shaft at the inner end of the structure whereby the tight side of the belt will be the live side, a coking plate arranged above the chain grate, a pivoted tail-plate forming a connection between the inner end of said coking plate and the chain grate, a feeding hopper adapted to deliver to said coking plate, a plunger arranged in said hopper and adapted to deliver to said coking plate, a rolling gear having a rolling meshing engagement with said plunger and a rolling engagement with a stationary member, a segment arm carried by said rolling gear, an actuating arm pivoted on the axis of said gear, a pair of stops carried by said segment arm and to which said operating arm may travel, and means for adjusting one of said stops toward the other.

In witness whereof, I, have hereunto set my hand and seal at Indianapolis, Indiana, this 4th day of March, A. D. one thousand nine hundred and seven.

HENRY E. WALLIS. [L. S.]

Witnesses:
 GEO. G. MORRIS,
 JOHN H. GIBBONS.